Nov. 21, 1961     I. O. SALYER ET AL     3,009,206
INJECTION MOLDING OF CRYSTALLINE POLYSTYRENE
Filed Jan. 12, 1959
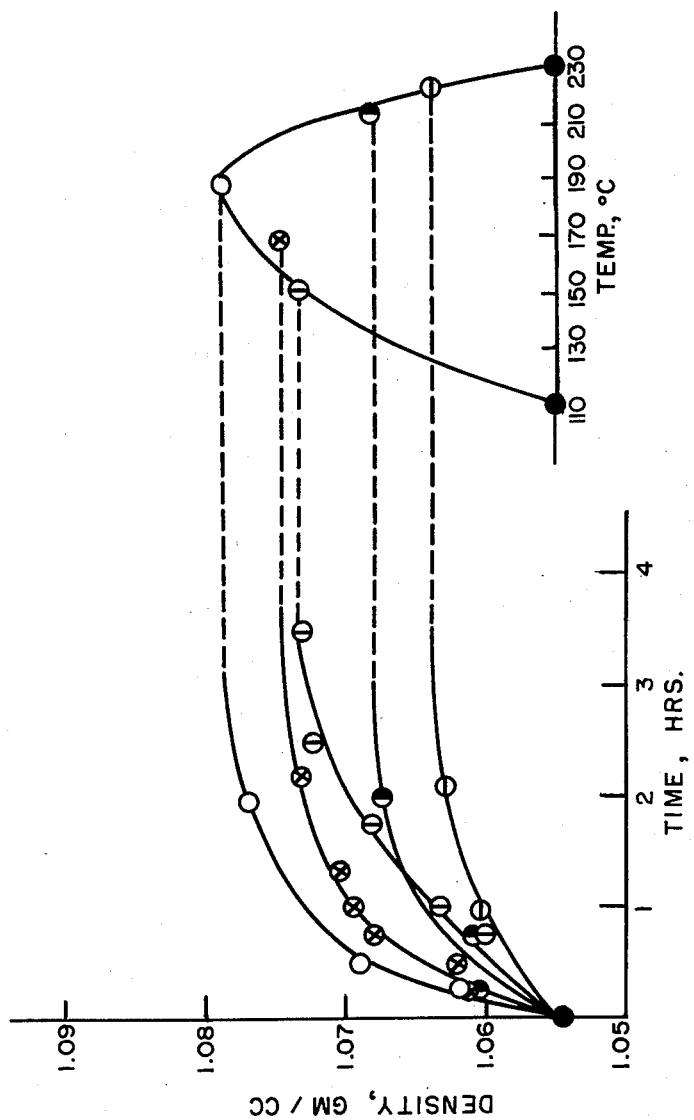
INVENTORS
IVAL O. SALYER
ALLEN S. KENYON
HARRY P. HOLLADAY
BY

United States Patent Office 3,009,206
Patented Nov. 21, 1961

3,009,206
INJECTION MOLDING OF CRYSTALLINE POLYSTYRENE
Ival O. Salyer, Allen S. Kenyon, and Harry Philip Holladay, Dayton, Ohio, assignors to Monsanto Chemical Company, St. Louis, Mo., a corporation of Delaware
Filed Jan. 12, 1959, Ser. No. 786,260
10 Claims. (Cl. 18—55)

The present invention relates to the molding of crystallizable polystyrene. The invention is directed to the process of injection molding crystallizable polystyrene in partially crystalline form—the crystallinity being such that the molding will resist flow, thereby permitting the molding to be annealed outside the mold, but, the crystallinity not being sufficient to prevent flow through the orifice of the injection apparatus under molding conditions. The invention is further directed to a process of injection molding isotactic polystyrene in partially crystalline form, removing the molds and annealing the molded polystyrene to further develop crystallinity.

In another aspect the invention is directed to the process of annealing quenched, amorphous isotactic polystyrene at temperatures required to obtain crystallinity in the neighborhood of the maximum attainable.

The accompanying drawing illustrates the rate of crystallite growth, as measured by density, of isotactic polystyrene at various temperatures, and the temperatures which produce maximum crystallinity.

In one of the preferred embodiments of the present invention, isotactic polystyrene such as obtained from polymerization is extruded at temperatures well above the melting point, thereby being densified, cooled, preferably rapidly as by quenching, for example, in cold water to avoid excessive crystallization and to maintain the amorphous state, the temperature being lowered below 100° C. or below the glass temperature, granulated or pelleted by suitable means, and injection molded under conditions such that the resulting molding is sufficiently crystalline to resist flow, its crystallinity being evidenced by translucency. In cases in which the polystyrene is of undesirably high molecular weight, extrusion of the polystyrene in unstabilized form at high temperature prior to the molding step will be advantageous in causing some degradation and lowering of the molecular weight.

Polystyrene is one of the most important polymers of commerce, being widely used in a variety of applications. Polystyrene can be prepared by a number of procedures, e.g., it is known to polymerize styrene in the absence of added catalysts, by free radical catalysts such as by peroxides and related compounds, and by polymerizations in solvents in mass or bulk, and by emulsion and suspension techniques. However, ordinary commercial polystyrene has properties which render it unsuitable for a number of uses. In particular, ordinary commercial polystyrene has poor high temperature properties due to its softening and distorting at temperatures of circa 90 to 100° C., and the fact that it has no appreciable elastomeric range as it is converted from a rigid solid to a viscous liquid to a free-flowing liquid over a very narrow temperature range, e.g., a Clash-Berg "Stifflex Range" of about 15 centigrade degrees.

The commercial polystyrene referred to above has what can be described as an irregular or atactic structure and is ordinarily found in amorphous form. It has recently been reported (Isotactic Polymers, G. Natta, Makromol. Chem., 16, 213 (1955)) that polystyrene having a regular isotactic or syndiotactic structure, and capable of assuming crystalline form can be prepared by polymerizing styrene in the presence of Ziegler catalysts.

The crystallizable polystyrene utilized herein is ordinarily obtained by polymerizing styrene in the presence of Ziegler catalysts, but crystallizable polystyrene obtained by any other method can be used. Crystallizable polystyrene is characterized by regularity of polymeric structure over a large portion of the molecular chains and in a substantial portion of the polymeric molecules. This regularity of structure refers to the steric configuration of the polymer, the alternate carbon atoms in the backbone of a polystyrene molecule are assymmetric and if such atoms have the same configuration (D or L) the polymer is said to be isotactic. If a purely isotactic polystyrene molecule were stretched out, all phenyl groups would stick out from one side. However, isotactic polystyrene is generally accompanied by atactic polystyrene, either in the same molecules with the isotactic structure or in separate molecules. In fact, in the present invention more than 50% of the polymeric structure can be atactic, and the structure can even be as much as 80% or more atactic. Such percentages of atactic polystyrene can be obtained either in the Ziegler-catalyzed polymerization procedures or by incorporating ordinary atactic polystyrene in isotactic polystyrenes obtained by Ziegler-catalyzed procedures. More purely isotactic polystyrenes for use in the present invention can be obtained by extraction of Ziegler polymerizates. In place of or in addition to isotactic polystyrene, any other form of crystallizable polystyrene, e.g., syndiotactic polystyrene, can be employed in the present invention.

In addition to the suitable procedures for obtaining isotactic polystyrene disclosed in the literature, the polymerization and isolation procedures disclosed in the copending application S.N. 498,254 of Roland J. Kern are very suitable, and are incorporated herein by reference.

The Ziegler catalysts employed in preparing isotactic polystyrene for use in the present invention are well known to the art. Probably the preferred group of these catalysts is that disclosed in Belgian Patent No. 533,362 issued May 16, 1955, to Ziegler, namely catalysts prepared by the interaction of a trialkyl aluminum with a compound of a metal of group IV–B, V–B, or VI–B of the periodic system, including thorium and uranium, a particularly preferred group of such catalysts are prepared by interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The mol ratio of aluminum to titanium (or zirconium) can vary over a wide range, suitable values being from 0.3:1 to 10:1 on up to 15:1 or higher, but it is generally preferred to use a ratio between 2.0:1 and 5:1. The amount of catalyst can vary, for example, from 0.01 to 5 weight percent based on styrene, but will desirably be in the neighborhood of 0.1 to 2.0 weight percent, and the polymerization can be effected over a wide temperature range, for example, from −10° C. to 140° C. or the like. The polystyrenes employed in the present invention are generally high molecular weight materials; however, suitable polystyrenes can vary in molecular weight and can have, for example, specific viscosities (0.1% solution in toluene at 25° C.) from about 0.05 to 1.0 or the like.

Substantial amounts of the polystyrene in the final molded compositions produced in the present invention are in crystalline form, say at least 10% but ordinarily much more. The percentage of crystallinity in the polymer cannot, of course, be greater than the percentage of crystallizable polymer. Ordinarily the percentage of crystallinity in the molded polystyrene compositions will not be greater than about 50%; 25 to 50% crystallinity is very suitable. The density of polystyrene is a suitable measure of crystallinity, and the final molded polystyrene will have densities of from about 1.06 or greater to 1.09, preferably 1.07 to 1.08. It is generally desirable to anneal the molded polystyrene compositions to a crystallinity at or near the maximum attainable to avoid the possibility of further crystallization in use with accompanying change in properties.

The isotactic polystyrene powder as obtained from Ziegler polymerization is ordinarily partially crystalline in form. However, heating the powder to temperatures well above the melting point (230° C.), e.g., to temperatures of 280° or so, will destroy the crystallinity and will also destroy crystallization sites; if the polymer is then cooled below the glass temperature, i.e., below 95–100° C., it will be substantially in amorphous form, but crystallization sites will have been re-established during the cooling process and subsequent heating will then re-establish the crystalline form. It is also possible to obtain the amorphous form by simply heating crystalline polystyrene just above its melting point, say to 240° C., and such form can be retained by then rapidly cooling to below the glass temperature; or alternatively, since 240° C. is not high enough to substantially destroy the crystallization sites, the amorphous form can be used directly in the present process without cooling below the glass temperature.

Crystalline polystyrene compositions are characterized by a broadened Stifflex or transition range as compared to amorphous polystyrene. The transition range refers to the temperature range in which the polymer is a flexible solid. As determined by the Clash-Berg method (Industrial Engineering Chemistry, 34, 1218 (1942)), the Stifflex range is the range of temperatures between the brittle temperature ($T_f$) at which the stiffness modulus is 135,000 p.s.i. and the rubber temperature ($T_{2000}$) at which the stiffness modulus is 2000 p.s.i. In the case of crystalline polystyrene, the brittle temperature is about 97° C. and the rubber temperature is about 230° C.; there is almost a linear relationship between the stiffness modulus and temperature in the 110°–220° C. range. In the case of crystalline polystyrene, $T_f$ is approximately of the same value as the glass temperature ($T_g$), 95–100° C., below which the polymer is a rigid solid, and $T_{2000}$ has approximately the same value as the melting point ($T_m$) at which the crystalline polystyrene melts, 230° C. as determined by disappearance of birefringence. In practicing the present injection molding process, it will always be necessary to stay within the Stifflex range, as the material would be too rigid below $T_f$ and crystallinity would be lost above $T_{2000}$. The temperature at which a material changes from a rigid solid to a flexible solid as the temperature is increased is referred to as the second order transition temperature.

The accompanying graph illustrates the variation in density of crystallizable polystyrene as a function of annealing time at several temperatures. Density is a measure of crystallinity as noted hereinabove. It can be seen that maximum crystallinity is rapidly attained at 190° C., in a matter of two hours or so, and that crystallization is rapid in the range of 170° to 210° C., or even down to 150° C., but that crystallization is slow at temperatures either higher or lower than these ranges making it impractical if not impossible to obtain maximum crystallinity by use of such higher or lower temperatures.

It can be seen from the accompanying graph and the description thereof that the crystallinity of isotactic polystyrene is dependent upon the time for which it is heated at elevated temperature. It follows that molding time and temperature are important variables in the present injection molding procedure. Temperature, of course, affects not only the development of crystallinity of the polystyrene, but also the flow and other molding properties of a polystyrene of specified crystallinity. The time and molding temperature should be such that sufficient crystallinity is developed for a molding to hold its shape, when exposed to temperatures above 100° C., but must not be such that sufficient crystallinity is developed to prevent injection molding at temperatures below the melting point of crystalline polystyrene and in the specified range of rapid crystallization. If the isotactic polystyrene is molded at rapid crystallization temperatures, such as from about 170 to about 210° C., it is certain that enough crystallinity will be developed in a normal molding cycle to prevent cold flow of the polystyrene molding under its own weight when exposed to temperatures above 100° C. If the molding is translucent rather than transparent, it is evident that there is sufficient crystallinity. If the molding has sufficient crystallinity to resist flow at $T_f$ or temperatures just above $T_f$, the molding can be quickly cooled to $T_f$ or below and then slowly heated to develop additional crystallinity as the temperature increases. It is preferable, of course, that the molding have sufficient crystallinity to resist flow at somewhat higher temperatures so that the molding can be rapidly annealed, e.g., by molding, removing from the mold and annealing at rapid crystallization temperatures.

Alternatively the molding die may be heated to a temperature of 100° C. or above, say 130–150° C., and the after-annealing treatment eliminated.

The molding will be effected in a time short enough to prevent development of sufficient crystallinity to cause the polystyrene to "set" in the cylinder of the injection molding machine so that it cannot be injection molded. So long as crystallinity is of the order of 5–10% or so, as evidenced by density of about 1.06–1.07, the isotactic polystyrene can be injection molded according to the present invention. The requirements for the moldability of the isotatic polystyrene can be expressed simply in terms of flow characteristics; if the polystyrene can, for example, at the stipulated temperatures be injected as a 1 oz. shot through an orifice ⅛-inch in diameter and ⅜-inch long with a plunger time of 5 seconds by use of 10,000 p.s.i. pressure under molding conditions, it has proper flow characteristics and crystallinity for molding. It must be possible to carry out the injection molding below the melting point of crystalline polystyrene, i.e., 230° C., in order to avoid destroying crystallinity, and it is preferable to carry out the molding at temperatures no higher than 210° C. to provide rapid development of sufficient crystallinity. Temperatures of at least 170° C. will ordinarily be required to insure sufficient flow. Although heating times of 1 hour or more can be employed under certain conditions, the isotactic polystyrene will not ordinarily be heated in the injection apparatus for periods longer than twenty-five minutes, and much shorter times will often be employed, for example, from 5 to 15 minutes, and times of the order of one minute may be suitable under some conditions. In some cases it may be advantageous to preheat the granulated isotactic polystyrene prior to introduction to the injection apparatus, or to utilize injection apparatus having "zone" heating so that the isotactic polystyrene can be heated to temperatures of, say, not greater than 150° C., prior to being heated to rapid crystallization temperatures such as 170 to 210° C. during the injection procedure. The use of such expedients will avoid any necessity of keeping a large reservoir of material at rapid crystallization temperatures and permit easier control of the time for which rapid crystallization temperatures are maintained. It will be understood that rapid crystallization temperatures will be employed with short molding cycles, and less rapid crystallization temperatures with longer molding cycles to insure the proper development of crystallinity in the polystyrenes as taught herein. The proper molding temperatures for any particular injection molding machine and molding cycle can now readily be determined in view of the disclosure herein.

As the present invention is usually practiced, the hot isotactic, partially crystalline polystyrene is injected into and molded in relatively cold mold die, the polystyrene thereby being sufficiently cooled to permit immediate removal from the mold without distortion.

Depending upon the polymer and its rate of crystallization, as influenced by crystallizable content and molecular weight, it may be advantageous to inject the crystallizable polystyrene into molds that have been heated to 100° C. or even as hot as 150° C.

The advantages of the injection molding procedure of the present invention are many and important. The alternative would be to use a melt process, as by heating the polystyrene to temperatures of 240° C. or above, injecting the hot polystyrene into molds heated to about 240° C., and permitting the molds to cool slowly in order to develop crystallinity. It is obvious that such a procedure would tie up molds for a much longer time than the process of the present invention which does not require excessively slow cooling in the molds. If a melt process injection was followed by rapid cooling, an amorphous molding would be obtained, and the molding would become distorted if subsequently heated outside the mold to develop crystallinity, or if heated above 100° C. in the end-use application of the material.

An additional advantage of the present process is that it does not require extraordinarily high molding temperatures, but permits the use of temperatures of 200° C. or less, thereby making it possible to use ordinary injection molding apparatus rather than requiring molding apparatus specifically designed for use at high temperatures, such as 260–280° C.

In accordance with the present invention the molded polystyrene articles are annealed at temperatures of from about 170° to 210° C., preferably of the order of 190° C., in order to obtain maximum crystallinity. As can be seen from the accompanying graph it is necessary to utilize such temperatures in order to obtain maximum crystallinity, at least in order to obtain such crystallinity within reasonable curing time. It is advantageous to develop the maximum crystallinity in order to improve rigidity and similar properties, and also in order to avoid possible changes in the properties of the material due to crystallization during use at elevated temperature where a material of known, stable properties is required. The advantage of such annealing of isotactic polystyrene is not limited to annealing of molded articles but prevails also in annealing any isotactic polystyrene articles, such as films, fibers, coating, etc.

The following examples are illustrative of certain embodiments of the invention.

Example 1

A sample of isotactic polystyrene prepared by Ziegler polymerization, and stabilized with 1% by weight stannous stearate plus 0.1% Santowhite Crystals antioxidant was extrusion refined on a 1″ NRM extruder at a barrel temperature of 240° C. and die temperature of 260° C., with a nylon processing screw operating at 120 revolutions per minute for two passes, and then a polyethylene refining screw with a 0.960 inch torpedo at 120 revolutions per minute for two more passes. The extrusion rate on the last pass was 40 grams per minute. The refined isotactic polystyrene particles were then used for injection molding in 1 oz. shots to obtain 2-inch discs and test specimens for impact, tensile and flexural tests. Moldings were successfully made at 180° C. and 194° C. using 800 p.s.i. ram pressure and a mold cycle of 20 seconds under ram pressure, 20 seconds hold in the mold, and 20 seconds to remove the sample and align the mold for the next shot. The partially crystalline molding obtained at 194° C. had the following properties.

| | |
|---|---|
| Impact strength (Izod) | 0.21 ft. lbs./inch of notch. |
| Flexural strength at break | 15,380 p.s.i. |
| Flexural deflection | 15 inches. |
| Tensile strength | 7670 p.s.i. |
| Tensile elongation at break | 5.5%. |

The samples were then annealed in an oven at 95 to 150° C. for two weeks to cause further crystallization as evidenced by density of 1.0787.

Example 2

Isotactic polystyrene powder was extruded in a 1″ NRM extruder at barrel and die temperatures of 225° C. with a nylon processing screw and then at the same temperatures with a polyethylene refining screw with a 0.990 inch torpedo. A 1 oz. Watson-Stillman apparatus was then used for injection molding at 180° C. at 1200 p.s.i., and 190° C. at 1200 p.s.i., to produce crystalline moldings.

The isotactic polystyrene utilized above was prepared by Ziegler catalyzed polymerization utilizing $TiCl_4$ and triethyl aluminum in hydrocarbon solvent. The high molecular weight polystyrene was washed with isobutanol and acetone to remove catalyst residues and room temperature soluble polymer and then extruded. Extrusion refines the polymer and reduces molecular weight somewhat; for example, three passes through an extruder with 0.960 inch torpedo at 240° C. give isotactic polystyrene having melt index of 5 decigrams/minute at 240° C. and percent recovery of 10. Melt index is determined by forcing the molten polymer through a small orifice (ASTM–D–1238–52T) and percent recovery is a measure of the increase in diameter of the extruded polymer following its extrusion through the orifice.

Example 3

The crystallinity of several isotactic polystyrene samples was determined by X-ray diffraction, and the density of the same samples was determined by a density gradient column as described by Hunter and Oakes (Trans. Faraday Soc. 41, 49 (1945)), utilizing ten concentrations of KBr in water to give densities ranging from 1.04 to 1.10. Taking 1.12 as the 100% crystallinity point (G. Natta, Makromal. Chem., 16, 77 (1955)), it was found that density varies linearly with total crystallinity, the total crystallinity going from practically zero at 1.05–1.06 to 27% at 1.078 to 100% at 1.12; thus a 1% change in crystallinity corresponds to a density change of .0007 gram/cc.

Example 4

A sample of quenched amorphous isotactic polystyrene was heated at 190° C. for two hours to develop density of about 1.0775 corresponding to a crystallinity of about 25%.

Example 5

A sample of quenched amorphous isotactic polystyrene was heated at 170° C. for 2 hours to develop density of about 1.0725 or crystallinity of about 20%.

Example 6

Crystallizable polystyrene powder obtained by polymerizing styrene over triethyl aluminum/vanadium trichloride catalyst was extruded at high temperature and quenched. The quenched material was then injection molded with a cylinder temperature of about 190–195° C. and a mold die heated to about 150–170° C. Utilizing either a 2 or 3 minute molding cycle (e.g., 1 minute under pressure, 1 minute set, and 1 minute to remove and align), moldings were obtained which were annealed without distortion by heating at about 150° C. for in excess of two hours. During the described molding procedure, crystallizable polystyrene was present in the cylinder of the injection apparatus at the stated temperature for times up to about one-half hour.

We claim:

1. A process of injection molding polystyrene which comprises forcing crystallizable polystyrene under pressure at temperatures of about 170° to 210° C. through an orifice into a mold die to mold same and removing the molded product from the die before any additional annealing step.

2. A process of injection molding crystallizable polystyrene which comprises heating crystallizable polystyrene to temperatures from about 170° C. to below the melting point of crystalline isotactic polystyrene and forcing the polystyrene through the orifice of the injection apparatus into a mold die, the polystyrene being held at the stated temperatures for a time long enough to develop sufficient crystallinity for the resulting molding to hold its shape at temperatures above the second order transition of polystyrene, but the amount of crystallinity being too small to prevent forcing the polystyrene through an orifice 1/8-inch in diameter and 3/8-inch long under a ram pressure of 10,000 p.s.i. with a plunger stroke time of 5 seconds.

3. The process of claim 2 in which the time in the heating cylinder of the injection apparatus is from 5 to 25 minutes.

4. The process of claim 2 in which the final density of the polystyrene is 1.06 to 1.07.

5. The process of claim 2 in which the molded product is further annealed by heating.

6. The process of claim 2 in which the molded product is annealed at temperatures of 150 to 210° C.

7. The process of preparing molded articles of isotactic polystyrene which comprises heating isotactic polystyrene above the melting point of crystalline isotactic polystyrene, cooling same to obtain isotactic polystyrene in amorphous state, injection molding the isotactic polystyrene at rapid crystallization temperatures in the range of 150 to 210° C. and removing the resulting polystyrene article having sufficient crystallinity to retain its shape when heated above the second order transition temperature of polystyrene.

8. The process of preparing molded articles of isotactic polystyrene which comprises heating isotactic polystyrene to temperatures above 260° C. and extruding same, cooling to temperatures below 100° C., and then forcing the isotactic polystyrene at temperatures of about 170 to 210° C. into a mold die to mold same and removing the molded product from the die before any additional annealing step.

9. The process of claim 8 in which the mold die is unheated.

10. The process of claim 8 in which the mold die is heated.

References Cited in the file of this patent

UNITED STATES PATENTS 2,329,571    Wiley _____ Sept. 14, 1943
2,361,900    Lowry et al. _____ Oct. 31, 1944

OTHER REFERENCES

Tobolsky: "The Mechanical Properties of Polymers," Scientific American, September 1957, pp. 121–126, 128, 133, 134.